(12) United States Patent
Faturechi et al.

(10) Patent No.: US 11,875,394 B2
(45) Date of Patent: Jan. 16, 2024

(54) MACHINE LEARNING MODEL FOR DETERMINING A TIME INTERVAL TO DELAY BATCHING DECISION FOR AN ORDER RECEIVED BY AN ONLINE CONCIERGE SYSTEM TO COMBINE ORDERS WHILE MINIMIZING PROBABILITY OF LATE FULFILLMENT

(71) Applicant: Maplebear Inc., San Francisco, CA (US)

(72) Inventors: Reza Faturechi, San Francisco, CA (US); Site Wang, Fremont, CA (US); Jagannath Putrevu, Daly City, CA (US)

(73) Assignee: Maplebear Inc., San Francisco, CA (US)

( * ) Notice: Subject to any disclaimer, the term of this patent is extended or adjusted under 35 U.S.C. 154(b) by 67 days.

(21) Appl. No.: 17/591,584

(22) Filed: Feb. 2, 2022

(65) Prior Publication Data

US 2023/0245213 A1     Aug. 3, 2023

(51) Int. Cl.
*G06Q 10/0633* (2023.01)
*G06Q 30/0601* (2023.01)
*G06N 3/084* (2023.01)

(52) U.S. Cl.
CPC ......... *G06Q 30/0635* (2013.01); *G06N 3/084* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 10,163,070 B1 * | 12/2018 | Phillips | G06Q 10/0834 |
| 10,242,336 B1 * | 3/2019 | Agarwal | G06Q 10/083 |
| 2016/0042315 A1 * | 2/2016 | Field-Darragh | H04B 5/0062 |
| | | | 705/28 |

(Continued)

FOREIGN PATENT DOCUMENTS

WO    WO-2007001212 A2 *    1/2007    ............ A62C 5/002

OTHER PUBLICATIONS

Thomas et al "Simulating Order Fulfillment With Product Substitutions in an Assemble-to-Order Supply Chain", Dec. 2006, IEEE, pp. 2012-2020 (Year: 2006).*

(Continued)

*Primary Examiner* — Romain Jeanty
(74) *Attorney, Agent, or Firm* — Fenwick & West LLP

(57) ABSTRACT

An online concierge identifies orders to shoppers, allowing shoppers to select orders for fulfillment. The online concierge system may generate batches that include multiple orders, allowing a shopper to select a batch to fulfill multiple orders. As orders are continuously being received, delaying identification of orders to shoppers may allow greater batching of orders. To allow greater opportunities for batching, the online concierge system estimates a benefit for delaying identification of an order by different time intervals and predicts an amount of time to fulfill the order. The online concierge system then delays assigning orders for which there is a threshold benefit for delaying and selects a time interval for delaying identification of the order that does not result in greater than a threshold likelihood of a late fulfillment of the order.

21 Claims, 6 Drawing Sheets

(56) References Cited

U.S. PATENT DOCUMENTS

| 2018/0025408 A1* | 1/2018 | Xu .................... G06Q 30/0635 |
| | | 705/26.81 |
| 2018/0300800 A1* | 10/2018 | Rajkhowa ............ G06Q 10/083 |
| 2019/0114583 A1 | 4/2019 | Ripert et al. |
| 2019/0236740 A1 | 8/2019 | Rao et al. |
| 2020/0219171 A1 | 7/2020 | Zhuang et al. |

OTHER PUBLICATIONS

PCT International Search Report and Written Opinion, PCT Application No. PCT/US22/48759, dated Feb. 14, 2023, 9 pages.

\* cited by examiner

MACHINE LEARNING MODEL FOR DETERMINING A TIME INTERVAL TO DELAY BATCHING DECISION FOR AN ORDER RECEIVED BY AN ONLINE CONCIERGE SYSTEM TO COMBINE ORDERS WHILE MINIMIZING PROBABILITY OF LATE FULFILLMENT

BACKGROUND

This disclosure relates generally to fulfilling orders for items through an online concierge system, and more specifically to machine learning models for determining a time interval for delaying identification of a received order to one or more shoppers for selection to increase batching of orders while avoiding late fulfillment.

In current online concierge systems, shoppers (or "pickers") fulfill orders at a physical warehouse, such as a retailer, on behalf of users as part of an online shopping concierge service. An online concierge system provides an interface to a user (or "customer") identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems allow users to specify a time window during which orders are fulfilled. For example, an online concierge system allows a user to select from various discrete time windows during which items included in an order are obtained and delivered to the user (i.e., during which the order is fulfilled). For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific time window for receiving items from an order or to obtain the items in an order within a specified time interval from a time when the order is placed.

Additionally, an online concierge system allows users to specify a short-term order for fulfillment within a time interval of a time when the order was received. For example, a short term-order specifies delivery of a short-term order within two hours of a time when the online concierge system receives the order. While this allows users flexibility in having orders fulfilled within a specified time interval of a time when the order was received by an online concierge system, the specified time interval for fulfillment of a short-term order provides uncertainty for a user to account for when the order will be delivered to the user.

Conventionally, an online concierge system identifies a received order to one or more shoppers as soon as possible after receiving the order to reduce a likelihood of the received order being fulfilled later than a time identified by the order. However, online concierge systems may conserve resources for fulfilling orders by generating batches including multiple orders that are capable of being fulfilled together by a single shopper. By displaying orders to shoppers for selection shortly after receiving the orders, conventional online concierge systems are unable to evaluate orders received after an order for potential inclusion in a batch with an order, which increases a number of orders that are evaluated for inclusion in a batch with the order that increases a likelihood of an online concierge system conserving resources by including the order in a batch with other orders.

SUMMARY

An online concierge system receives orders from users. Each order identifies a warehouse and one or more items to obtain from the identified warehouse. Additionally, each order identifies a time for fulfillment of the order to be fulfilled by a shopper. For example, an order identifies a discrete time interval maintained by the online concierge system during which the order is to be fulfilled. For example, the online concierge system maintains multiple two hour intervals during for fulfilling orders, and an order includes a discrete time interval selected by a user so items included in the order are delivered to the user at a time within the selected discrete time interval. Additionally, the online concierge system allows a user to specify a short-term order for fulfillment when there is shopper availability after the online concierge system receives the order.

To evaluate how to fulfill orders, the online concierge system trains one or more fulfillment models that determine a predicted amount of time for a shopper to fulfill an order. In various embodiments, the online concierge system trains a fulfillment model using training data generated from previously fulfilled orders by the online concierge system. The training data includes examples that each correspond to previously fulfilled orders and include characteristics of a previously fulfilled order. Example characteristics of a previously fulfilled order include information identifying a location to which the previously fulfilled order was delivered, items included in the previously fulfilled order, a number of items included in the previously fulfilled order, a value of the previously fulfilled order, a warehouse from which the items of the previously fulfilled order were obtained, a time taken by a shopper to accept to fulfill the order, a distance traveled by a shopper to get to the warehouse, a time to pick the items in the warehouse, and to deliver items from the warehouse to the location identified by the previously fulfilled order, a time when the online concierge system received the previously fulfilled order, and a time when the previously fulfilled order was fulfilled. From the historical data describing previously fulfilled orders, the online concierge system trains the fulfillment model to determine a predicted amount of time for a shopper to fulfill an order based on characteristics of the order.

In some embodiments, the fulfillment model predicts lengths of time for a shopper to perform one or more tasks for fulfilling an order. For example, the fulfillment model accounts for a selection time between the online concierge system 102 receiving an order from a user and a shopper selecting the order for fulfillment that accounts for a rate at which the online concierge system receives orders including locations within a geographic region identified by the order, a rate at which shoppers select orders including locations within the geographic region for fulfillment, a number of orders including locations within the geographic region received by the online concierge system 102 and not selected for fulfillment by shoppers. As characteristics of an order (e.g., a distance between a warehouse in an order and a location for fulfilling the order, an overall value of the order) may affect selection of the order by a shopper for fulfillment, the fulfillment model may also account for order-specific characteristics to determine an adjustment for the selection time determined for the order, allowing the fulfillment model to account for characteristics of the order that may lengthen or shorten the selection time for the order. Further, the fulfillment model accounts for a travel time of a shopper fulfilling the order, accounting for a time interval after the shopper selects the order for fulfillment for the shopper to obtain the items of the order from a warehouse identified by the order and to deliver the items from the order to a location identified by the order. The travel time may be determined from characteristics of the order as well as historical information about traffic or road conditions the online concierge system obtains from a third party system or from previously fulfilled orders by shoppers.

In various embodiments, the online concierge system trains and maintains separate models for determining the selection time of an order, the adjustment to the selection time of the order, and the travel time of the order. Each of the models be any machine learning model, such as a neural network, boosted tree, gradient boosted tree, random forest model, or combination of machine learning models. Different types of machine learning models may be used to determine the selection time of an order, the adjustment to the selection time of the order, and the travel time of the order, with the fulfillment model combining the separate models to determine a predicted amount of time for a shopper to accept and fulfill an order. For example, the predicted amount of time for a shopper to fulfill an order is a sum of the shopper selection time, picking time and travel time of the order and a product of the selection time of the order and the adjustment to the selection time of the order. However, in other embodiments, the predicted amount of time for a shopper to accept and fulfill an order is determined from any suitable combination of the shopper selection time, picking time and travel time of the order, the adjustment to the selection time of the order, and the selection time of the order. Alternatively, the fulfillment model is a single model generating the selection time of an order, an adjustment to the selection time of the order, a shopper selection time, a travel time of the shopper to get to the warehouse, a picking time of the order, a travel time of the order, and determining the predicted amount of time to fulfill the order by combining the selection time, the adjustment to the selection time, and the shopper selection time, picking time and travel time.

As the online concierge system receives orders for fulfillment, shoppers select different orders to fulfill the orders. For example, the online concierge system identifies orders available for fulfillment to a shopper, and the shopper selects one or more of the identified orders to fulfill. Additionally, the online concierge system generates batches of orders, with each batch including a plurality of orders, and identifies one or more batches to shoppers along with orders available for fulfillment. When a shopper selects a batch, the shopper selects each order included in the selected batch for fulfillment. As a batch includes multiple orders, the online concierge system conserves resources when a shopper selects a batch, as a single shopper is leveraged to fulfill the different orders included in the batch.

As orders are consistently received by the online concierge system, to increase opportunities to batch orders, the online concierge system trains a batch benefit model that receives a time interval as an input and outputs a predicted benefit from delaying identification of an order to shoppers for fulfillment for the received time interval. Hence, the batch benefit model allows the online concierge system to determine predicted benefits from delaying identification of an order to shoppers for selection by different time intervals rather than identifying the order to shoppers after the order is received. Example benefits to the online concierge system include a number of minutes or other amount of time saved for fulfilling an order or an amount of resources saved for fulfilling an order. In various embodiments, the batch benefit model outputs a predicted likelihood of an order being included in a batch if identification of an order to shoppers for fulfillment is delayed for the received time interval.

To train the fulfillment model by generating batching training data for the batch benefit model comprising a plurality of examples. Each example of the batching training data includes a time interval for delaying an order and one or more information describing an example order, such as the information further described above. A label is applied to each example, with a label applied to an example specifying a benefit to the online concierge system from delaying identification of the example order corresponding to the example by the time interval; in some embodiments, the benefit to the online concierge system specifies a probability of the order corresponding to the example being included in a batch if identification of the order to shoppers is delayed by the time interval. In other embodiments, the benefit to the online concierge system from delaying identification of the order corresponding to the example by the time interval specifies an amount of time to fulfill the example order corresponding to the example by delaying the example order corresponding to the example by the time interval. The online concierge system may obtain examples for the batching training data by simulating effects of different lengths of time on inclusion of orders with different characteristics in a batch or may leverage information describing inclusion of prior orders delayed from being identified to shoppers for different lengths of time in batches selected for fulfillment by shoppers.

When the online concierge system receives orders for fulfillment, the online concierge system determines whether to delay identification of the order to shoppers for selection based on application of the fulfillment model and application of the batch benefit model to the order. In one embodiment, the online concierge system applies the batch benefit model to the received order and to one or more time intervals, determining a predicted benefit to the online concierge system for delaying identification of the received order to shoppers by each of the one or more time intervals. In response to none of the one or more time intervals having a predicted benefit to the online concierge system equaling or exceeding the threshold predicted benefit, the online concierge system does not delay identification of the received order to one or more shoppers. However, in response to a predicted benefit to the online concierge system for delaying identification of the received order by at least one time interval equaling or exceeding a threshold predicted benefit, the online concierge system selects a time interval for delaying identification of the received order to one or more shoppers.

To select the time interval, the online concierge system generates a predicted overall fulfillment time for the order for a time interval by combining the predicted amount of time for a shopper to fulfill the received order based on characteristics of the received order from application of the fulfillment model to the order and the time interval. The online concierge system determines a probability of a sum of a time when the received order was received and the overall fulfillment time exceeding a time identified by the received order, so the determined probability indicates a probability of the received order being fulfilled later than the time identified by the received order. In various embodiments, the online concierge system trains and maintains a late fulfillment model that receives an overall fulfillment time and an order and outputs a probability of the order being fulfilled later than a time identified by the order. To train the late fulfillment model by generating late fulfillment training data comprising a plurality of examples. Each example of the late fulfillment training data includes an example late fulfillment order and a fulfillment time for the example late fulfillment order and may include additional information. A label is applied to each example, with a label applied to an example indicating whether the example late fulfillment order was fulfilled after a time identified in the example late fulfillment order. The online concierge system may obtain examples for the late fulfillment training data by simulating fulfillment of orders with different characteristics and different fulfillment times to determine whether a fulfillment time caused the example late fulfillment order to be fulfilled after a time identified by the order or may obtain examples for the probability training data from fulfillment of prior orders received by the online concierge system based on the fulfillment times for the prior orders.

In various embodiments, the online concierge system generates an overall fulfillment time for the order for each of a plurality of time intervals, such as for each time interval having a predicted benefit to the online concierge system equaling or exceeding the threshold predicted benefit, and determines the probability of a sum of the time when the received order was received and the overall fulfillment time exceeding the time identified by the received order for each of the plurality of time intervals. The online concierge system selects a time interval corresponding to a minimum probability of the sum of the time when the received order was received and the overall fulfillment time exceeding the time identified by the received order, so the selected time interval minimizes a probability of the received order being fulfilled later than the time identified by the received order. Thus, the selected time interval minimizes the probability of the received order being fulfilled after the time identified by the order while providing a benefit to the online concierge system by increasing a likelihood of the received order being included in a batch for fulfillment with one or more other orders.

In other embodiments, the online concierge system combines application of the batch benefit model and the fulfillment model to the received order. For example, the batch benefit model outputs a predicted amount of time saved for delaying identification of the received order to shoppers, so the online concierge system applies the batch benefit model to different time intervals, determining a predicted amount of time saved for each of the different time intervals. The online concierge system, for each time interval, determines the overall fulfillment time by summing the time interval for delaying identification of the order to shoppers and the predicted amount of time for a shopper to fulfill the received order based on characteristics of the received order from application of the fulfillment model to the order and decreases the sum by the predicted amount of time saved for the time interval. For each overall fulfillment time and corresponding time interval, the online concierge system determines a probability of the received order being fulfilled after the time identified by the received order by applying the late fulfillment model to combinations of the received order and the overall fulfillment time. The online concierge system identifies a set of time intervals corresponding to overall fulfillment times having less than a threshold probability of the received order being fulfilled after the time identified by the received order and selects a time interval of the set. For example, the online concierge system selects a time interval of the set having a minimum probability of the received order being fulfilled after the time identified by the received order. Hence, the online concierge system selects a time interval to delay identification of the received orders that minimizes a probability of the received order being fulfilled later than the time identified by the received order and that increases a likelihood of the received order being included in a batch with one or more other orders to allow the online concierge system to more efficiently allocate resources for order fulfillment by allowing a single shopper to fulfill the received order along with one or more other orders included in a batch with the received order.

In response to selecting the time interval for delaying identification of the received order, the online concierge system does not display the received order to shoppers during the selected time interval and displays the received order to shoppers after the selected time interval lapses. In alternative embodiments, the online concierge system displays the received order to shoppers during the selected time interval, and may display an indication that the received order is being further evaluated for the selected time interval. Additionally, during the delay of the selected time interval, the online concierge system evaluates additional orders received after the received order and during the selected time interval for inclusion in one or more batches including the received order and at least one other order received by the online concierge system after the received order to one or more shoppers for selection. If the received order is included in one or more batches with at least one additional order, the online concierge system displays the one or more batches to shoppers during the selected time interval in some embodiments. The online concierge system may use any suitable method for selecting one or more orders received after the received order and during the selected time interval to include in a batch including the received order. For example, the online concierge system selects one or more orders received after the received order that identify a common warehouse as the received order, that specify a location within a threshold distance of the received order, that specify a time for fulfillment within a threshold amount of the time identified by the received order, or that satisfy any other suitable criteria. In various embodiments, the online concierge system accounts for types of items included in various orders, numbers of items included in various orders, and any other characteristics of orders when determining whether to include different orders in a batch. In various embodiments, during the selected time interval for delaying display of the received order, the online concierge system hides the received order from the shoppers while displaying one or more batches including the received order and one or more orders received after the received order, allowing shoppers to select a batch including the received order and other orders during the selected time interval. In other embodiments, the online concierge system displays one or more batches including the received order and one or more additional orders received during the selected time interval and displays the received order to shoppers after the selected time interval has lapsed. Hence, delaying display of the received order by the selected time interval allows the online concierge system to increase a number of opportunities for including the received order in one or more batches, enabling more efficient fulfillment of orders by shoppers.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
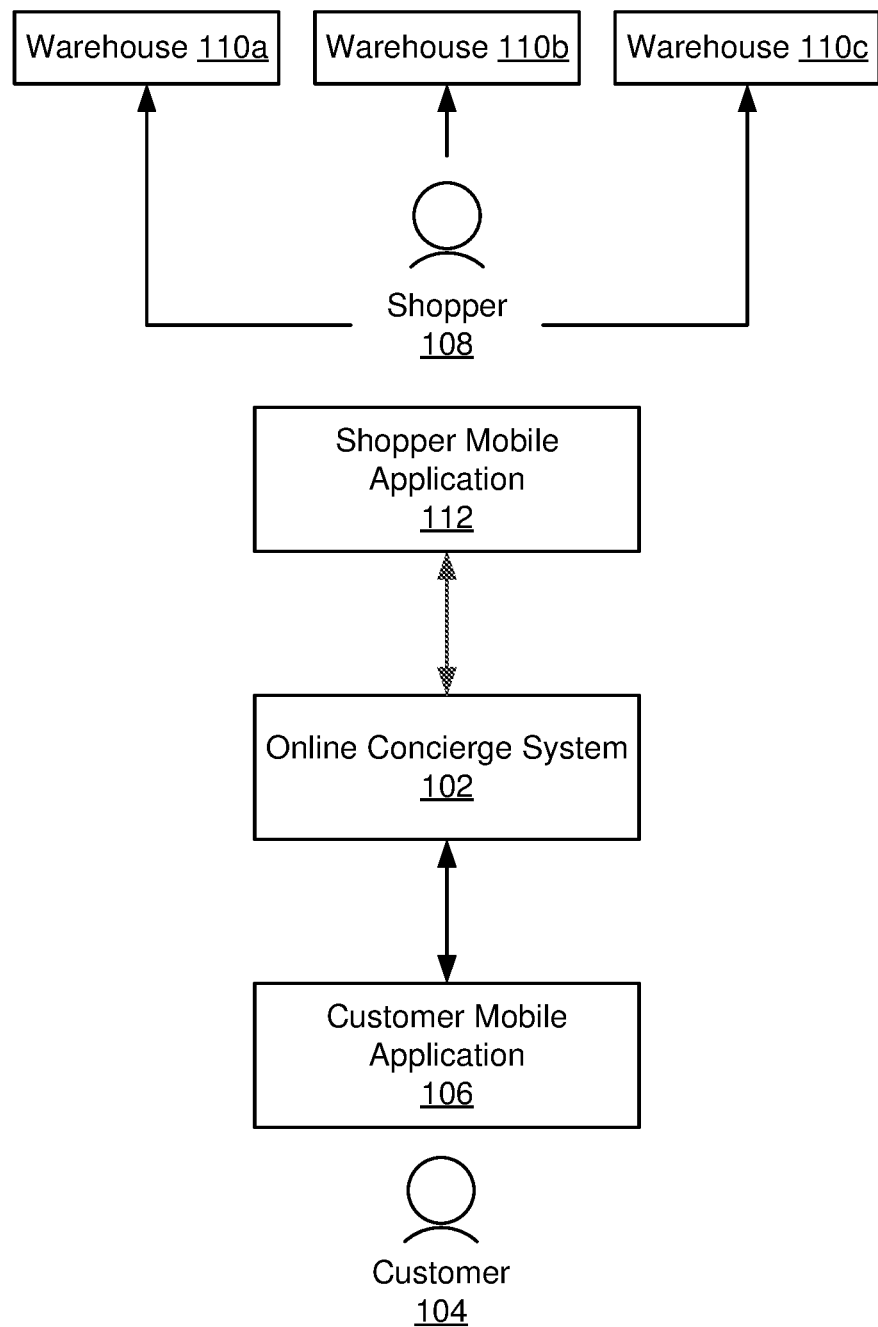
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
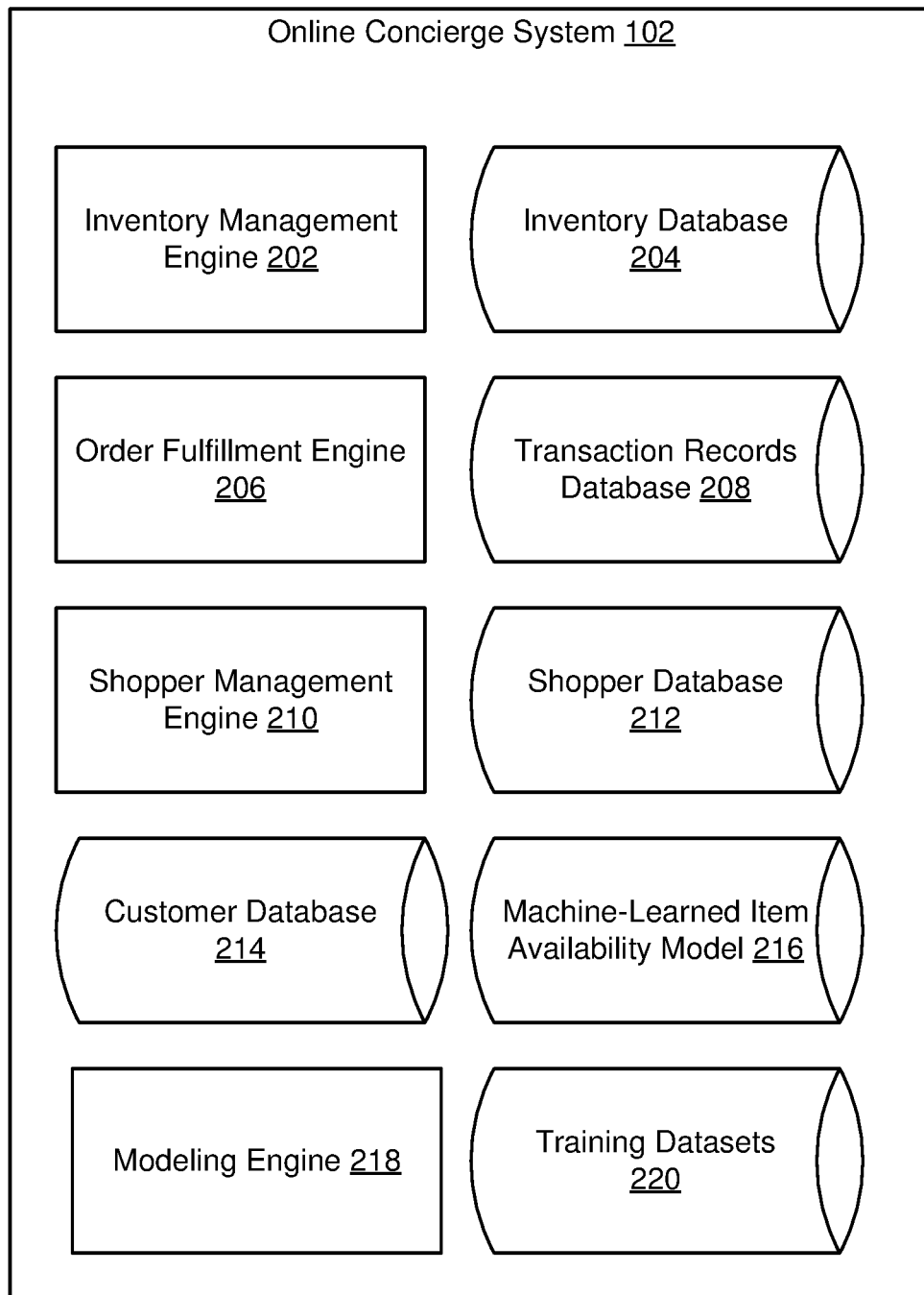
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 determines whether to delay display of a received order to shoppers for fulfillment by a time interval. In response to determining to delay the received order by a time interval, the order fulfilment engine 206 evaluates orders received after the received order and during the time interval for inclusion in one or more batches that also include the received order. After the time interval, the order fulfillment engine 206 displays the order to one or more shoppers via the shopper mobile application 112; if the order fulfillment engine 206 generated one or more batches including the received order and one or more orders received after the received order and during the time interval, the one or more batches are also displayed to one or more shoppers via the shopper mobile application 112.

As further described below in conjunction with FIGS. 4 and 5, to determine whether to delay display of an order to shoppers, the order management engine 206 determines a benefit to the online concierge system 102 from delaying display of the order by different time intervals. The determined benefit may be a probability of the order being included in a batch, an amount of time saved for fulfilling the order if the order is included in a batch, or any other suitable information. As further described below in conjunction with FIG. 4, the order management engine 206 applies a trained batch benefit model to a time interval and an order to determine a predicted benefit for delaying display of the order to shoppers by the time interval. In response to one or more time intervals resulting in at least a threshold benefit to the online concierge system 102 for the order, the online concierge system 102 selects a time interval for delaying display of the order to shoppers. As further described below in conjunction with FIGS. 4 and 5, when selecting a time interval, the online concierge system 102 predicts an overall fulfillment time for the order that accounts for a predicted fulfillment time of the order by a shopper and the time interval for which the order is delayed from display to shoppers and uses the predicted overall fulfillment time to predict a probability of the order being fulfilled later than a time identified by the order. In various embodiments, the order fulfillment engine 206 selects a time interval resulting in less than a threshold probability of the order being fulfilled later than the time identified by the order or resulting in a minimum probability of the order being fulfilled later than the time identified by the order, as further described below in conjunction with FIGS. 4 and 5.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained fulfillment model, further described below in conjunction with FIG. 4 that determines a predicted amount of time for a shopper to fulfill an order based on characteristics of the order. The fulfillment model is trained from orders previously fulfilled by the online concierge system 102. The predicted delivery time accounts for a selection time indicating a time interval from receipt of an order to selection of the order by a shopper for fulfillment from characteristics of orders received by the online concierge system 102 and characteristics of a particular order, as well as a travel time describing a length of time for a shopper to obtain items of the particular order and deliver the obtained items to a location identified by the order. The trained fulfillment model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models.

As further described below in conjunction with FIG. 4 the modeling engine 218 also trains and stores a batch benefit model, which determines a predicted benefit to the online concierge system 102 for delaying display of an order to shoppers for selection by a time interval. The batch benefit model receives a time interval and order as input, and outputs the predicted benefit to the online concierge system 102 for delaying display of the order to shoppers by the time interval. The predicted benefit output by the batch benefit model may be a probability of the order being included in a batch with one or more other orders, an amount of time saved for fulfilling the order if the order is included in a batch, an amount by which a cost to fulfill the order is reduced if the order is included in a batch, or any other suitable value. The batch benefit model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models. Training data for the batch benefit model may be obtained from previously fulfilled orders or batches of orders or may be obtained from simulations of order fulfillment.

Additionally, as further described below in conjunction with FIG. 4 the modeling engine 218 also trains and stores a late fulfillment model that receives a fulfillment time and an order and outputs a probability of the order being fulfilled later than a time identified by the order. The fulfillment time input to the late fulfillment model may account for a predicted amount of time to fulfill an order and a time interval by which the order is delayed from display to shoppers, as further described below in conjunction with FIG. 4. The late fulfillment model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models. Training data for the late fulfillment model may be obtained from previously fulfilled orders or batches of orders or may be obtained from simulations of order fulfillment.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
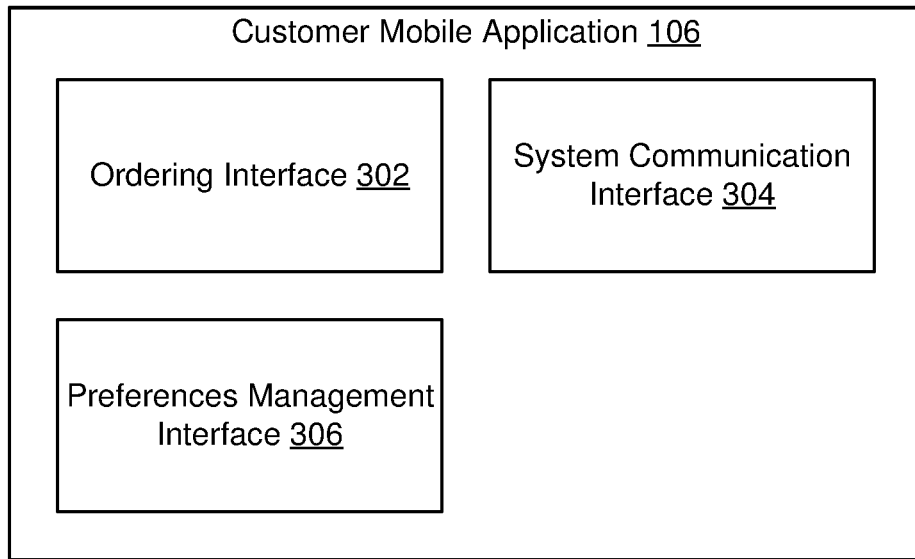
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
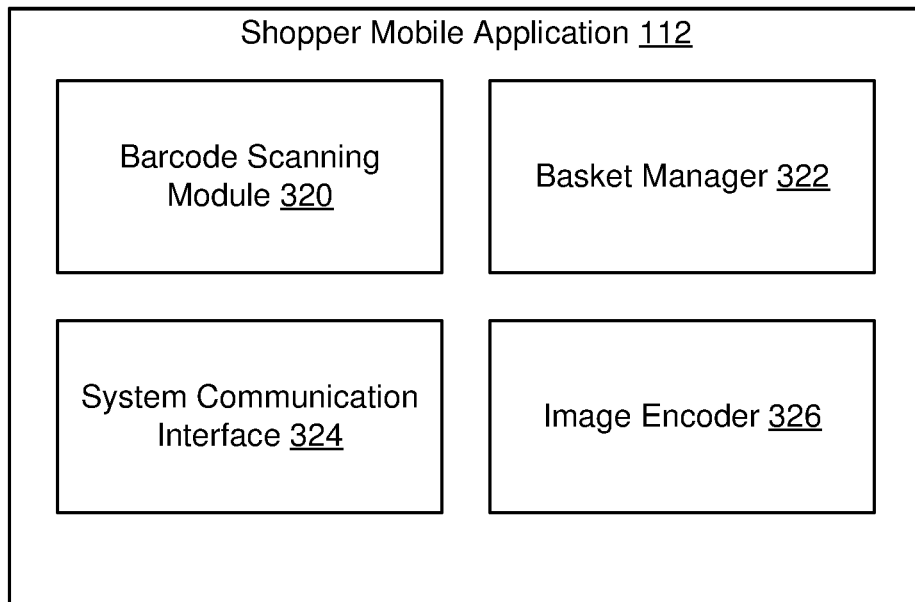
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Determining a Time Interval for Delaying Assignment of Orders to Shoppers

Figure 4:
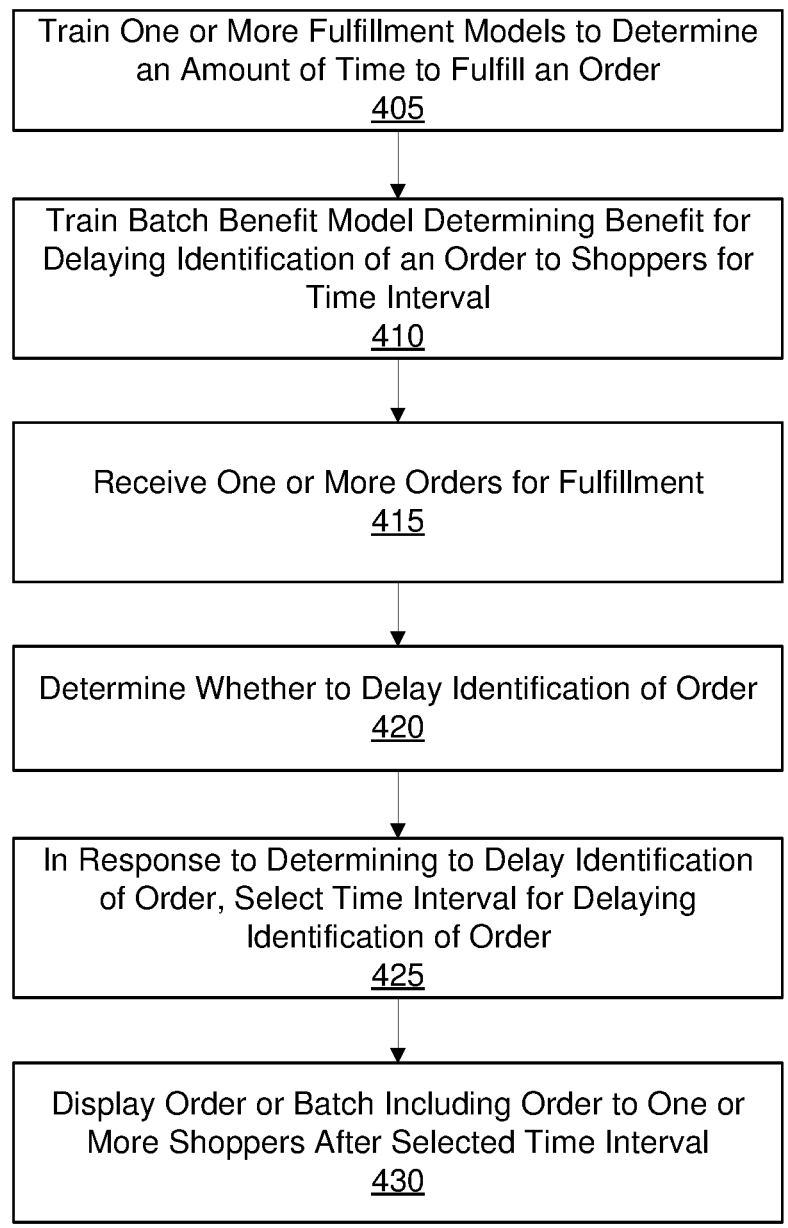
FIG. 4 is a flowchart of a method for determining a time interval for delaying assignment of one or more orders to a shopper, according to one embodiment.

FIG. 4 is a flowchart of one embodiment of a method for determining a time interval for delaying assignment of one or more orders to a shopper. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

An online concierge system 102 maintains a plurality of discrete time intervals during which orders received by the online concierge system are fulfilled. For example, the online concierge system maintains multiple two hour intervals for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled.

Additionally, the online concierge system 102 allows a user to specify a short-term order for fulfillment when there is shopper availability after the online concierge system 102 receives the order. The online concierge system 102 displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

The online concierge system 102 trains 405 one or more fulfillment models that determine an amount of time for a shopper to fulfill an order. To train a fulfillment model, the online concierge system 102 retrieves historical data describing fulfilled orders previously received by the online concierge system 102. For a previously fulfilled order, the historical data includes information identifying a location to which the previously fulfilled order was delivered, items included in the previously fulfilled order, a number of items included in the previously fulfilled order, a value of the previously fulfilled order, a warehouse 110 from which the items of the previously fulfilled order were obtained, a distance traveled by a shopper to deliver items from the warehouse 110 to the location identified by the previously fulfilled order, a time when the online concierge system 102 received the previously fulfilled order, and a time when the previously fulfilled order was fulfilled. From the historical data describing previously fulfilled orders, the online concierge system 102 trains 405 the fulfillment model to determine a predicted amount of time to fulfill an order by predicting lengths of time for a shopper to perform one or more tasks for fulfilling an order. The fulfillment model receives an order as an input and outputs a predicted amount of time to fulfill an order from characteristics of the order and shoppers within the determined geographic region for fulfillment.

In various embodiments, the fulfillment model accounts for a time between the online concierge system 102 receiving an order from a user and a shopper selecting the order for fulfillment. For example, the online concierge system 102 identifies a location included in an order and determines a geographic region including the location included in the order. Based on a rate at which the online concierge system 102 receives orders including locations within the determined geographic region, a rate at which shoppers select orders including locations within the determined geographic region for fulfillment, a number of orders including locations within the determined geographic region received by the online concierge system 102 and not selected for fulfillment by shoppers, the fulfillment model determines a selection time interval indicating a length of time from receipt of the order by the online concierge system 102 to a shopper selecting the order for fulfillment. The fulfillment model may account for any additional factors describing receipt of orders with locations within the determined geographic region and selection of orders with locations within the determined geographic region by shoppers for fulfillment in various embodiments. Hence, in various embodiments, the online concierge system 102 determines a geographic region including a location within an order and determines a selection time interval for the order, with the selection time interval indicating a length of time between receipt of the order by the online concierge system 102 and selection of the order for fulfillment by a shopper. For example, the fulfillment model determines an average selection time for the geographic region including the location identified by the order.

While the selection time interval accounts for numbers of orders received by the online concierge system 102 and selection of orders for fulfillment by shoppers, characteristics of an order may affect selection of the order by a shopper for fulfillment. For example, orders with higher values provide a shopper with increased compensation, causing orders with higher values to be more rapidly selected for fulfillment by shoppers. As another example, orders with longer distances between a warehouse 110 identified by the order and a location for delivery of the order provide increased compensation from the online concierge system 102 to a shopper, causing orders with longer distances for a shopper to travel from warehouse 110 to location for delivery to be more rapidly selected for fulfillment by shoppers. The fulfillment model accounts for order-specific characteristics to determine an adjustment for the selection time determined for the order, allowing the fulfillment model to account for characteristics of the order that may lengthen or shorten the selection time for the order. Example characteristics of an order for determining the adjustment include: a number of items in the order, a distance between a warehouse 110 identified in the order and a location identified in the order, a value of the order, an amount of compensation the user provides a shopper for fulfilling the order, as well as any other suitable characteristics. The fulfillment model combines the selection time and the adjustment to generate a delivery specific selection time for the order. In various embodiments, the delivery specific selection time is a product of the selection time for the order and the adjustment, while in other embodiments the selection time and the adjustment may be combined in any suitable manner.

The fulfillment model also accounts for a travel time of a shopper fulfilling the order, accounting for a time interval after the shopper selects the order for fulfillment for the shopper to obtain the items of the order from a warehouse 110 identified by the order and to deliver the items from the order to a location identified by the order. The travel time is determined from characteristics of the order as well as historical information about traffic or road conditions the online concierge system 102 obtains from a third party system or from previously fulfilled orders by shoppers. Characteristics of the order used to determine travel time include a number of items in the order (orders with greater number of items may increase a length of time in a warehouse 110 to obtain the items), a warehouse 110 from which the items are obtained, and a distance between the location of the warehouse 110 from which the items are obtained and a location identified by the order.

In various embodiments, the online concierge system 102 trains 405 the fulfillment model by generating training data for the fulfillment model comprising a plurality of examples from previously fulfilled orders. An example includes information describing a previously fulfilled order, such as the information previously described above. A label is applied to each example, with a label applied to an example specifying a length of time from the online concierge system 102 receiving the previously fulfilled order and the online concierge system 102 receiving an indication that the previously fulfilled order was fulfilled. Hence, the online concierge system 102 uses the length of time for a previously fulfilled order to be fulfilled as the labels for examples used to training 405 the fulfillment model, allowing the online concierge system 102 to leverage historical information about prior times for order fulfillment when training 405 the fulfillment model.

The online concierge system 102 initializes one or more layers of a network comprising the fulfillment model and applies the initialized fulfillment model to each of a plurality of examples of the training data. For an example of the training data, application of the fulfillment model outputs a predicted amount of time for a shopper to fulfill the example. The online concierge system 102 determines an error term from a loss function based on a difference between the label applied to the example of the training data and the predicted amount of time for the shopper to fulfill the example. The online concierge system 102 backpropagates the one or more error terms from the label applied to an example of the training data and the predicted amount of time for the shopper to fulfill the example through layers of a network comprising the fulfillment model. The backpropagation of the one or more error terms is repeated by the online concierge system 102 until the one or more loss functions satisfy one or more criteria. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for layers of the network comprising the fulfillment model. For example, the online concierge system 102 stores the weights of connections between nodes in the network as the set of parameters of the network in a non-transitory computer readable storage medium. Hence, training of the fulfillment model allows the online concierge system 102 to generate and to store network, such as a neural network or other machine learning model, that generates a predicted amount of time for a shopper to fulfill an order based on characteristics of the order.

In various embodiments, the online concierge system 102 trains and maintains separate models for determining the selection time of an order, the adjustment to the selection time of the order, and the travel time of the order. Each of the models may be trained from examples of training data, as further described above regarding training 405 the fulfillment model. Each of the models be any machine learning model, such as a neural network, boosted tree, gradient boosted tree, random forest model, or combination of machine learning models. Different types of machine learning models may be used to determine the selection time of an order, the adjustment to the selection time of the order, and the travel time of the order, with the fulfillment model combining the separate models to determine a predicted amount of time for a shopper to fulfill an order. For example, the predicted amount of time for a shopper to fulfill an order is a sum of the picking time and travel time of the order and a product of the selection time of the order and the adjustment to the selection time of the order. However, in other embodiments, the predicted amount of time for a shopper to fulfill an order is determined from any suitable combination of the travel time of the order, the adjustment to the selection time of the order, and the selection time of the order. Alternatively, the fulfillment model is a single model generating the selection time of an order, an adjustment to the selection time of the order, a picking time and travel time of the order, and determining the predicted amount of time to fulfill the order by combining the selection time, the adjustment to the selection time, and the picking and travel time.

As the online concierge system 102 receives orders for fulfillment, shoppers are assigned to different orders to fulfill the orders. For example, the online concierge system 102 identifies orders available for fulfillment to a shopper, and the shopper selects one or more of the identified orders to fulfill. Additionally, the online concierge system 102 generates batches of orders, with each batch including a plurality of orders, and identifies one or more batches to shoppers along with orders available for fulfillment. When a shopper selects a batch, the shopper selects each order included in the selected batch for fulfillment. As a batch includes multiple orders, the online concierge system 102 conserves resources when a shopper selects a batch, as a single shopper is leveraged to fulfill the different orders included in the batch.

As orders are consistently received by the online concierge system 102, to increase opportunities to batch orders, the online concierge system 102 trains 410 a batch benefit model that receives a time interval as an input and outputs a predicted benefit from delaying identification of an order to shoppers for fulfillment for the received time interval. Hence, the batch benefit model allows the online concierge system 102 to determine predicted benefits from delaying identification of an order to shoppers for selection by different time intervals. Example benefits to the online concierge system 102 include a number of minutes or other amount of time saved for fulfilling an order or an amount of resources saved for fulfilling an order. In various embodiments, the batch benefit model outputs a predicted likelihood of an order being included in a batch if identification of an order to shoppers for fulfillment is delayed for the received time interval.

To train 410 the fulfillment model training data is generated for the batch benefit model comprising a plurality of examples. Each example of the batching training data includes a time interval for delaying an order and one or more information describing an example order, such as the information further described above. A label is applied to each example, with a label applied to an example specifying a benefit to the online concierge system 102 from delaying identification of the example order corresponding to the example by the time interval; in some embodiments, the benefit to the online concierge system 102 specifies a probability of the order corresponding to the example being included in a batch if identification of the order to shoppers is delayed by the time interval. In other embodiments, the benefit to the online concierge system 102 from delaying identification of the order corresponding to the example by the time interval specifies an amount of time to fulfill the example order corresponding to the example by delaying the example order corresponding to the example by the time interval. The online concierge system 102 may obtain examples for the batching training data by simulating effects of different lengths of time on inclusion of orders with different characteristics in a batch or may leverage information describing inclusion of prior orders delayed from being identified to shoppers for different lengths of time in batches selected for fulfillment by shoppers.

The online concierge system 102 initializes one or more layers of a network comprising the batch benefit model and applies the batch benefit fulfillment model to each of a plurality of examples of the batching training data. For an example of the batching training data, application of the fulfillment model outputs a predicted benefit to the online concierge system 102 for delaying identification of an example order corresponding to the example by a time interval corresponding to the example. The online concierge system 102 determines an error term from a loss function based on a difference between the label applied to the example of the batching training data and the predicted benefit to the online concierge system 102 for delaying identification of the example order corresponding to the example by a time interval corresponding to the example. The online concierge system 102 backpropagates the one or more error terms from the label applied to an example of the training data and the predicted benefit to the online concierge system 102 for delaying identification of an order corresponding to the example by a time interval corresponding to the example through layers of a network comprising the batch benefit model. The backpropagation of the one or more error terms is repeated by the online concierge system 102 until the one or more loss functions satisfy one or more criteria. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for layers of the network comprising the batch benefit model. For example, the online concierge system 102 stores the weights of connections between nodes in the network as the set of parameters of the network in a non-transitory computer readable storage medium. Hence, training of the batch benefit model allows the online concierge system 102 to generate and to store a network, such as a neural network or other machine learning model, that generates a predicted benefit to the online concierge system 102 for delaying identification of an order to shoppers by a time interval based on the time interval and characteristics of the order.

As the online concierge system 102 receives 415 one or more orders for fulfillment, the online concierge system 102 determines 420 whether to delay identification of the order to shoppers for selection based on application of the fulfillment model and application of the batch benefit model to the order. In one embodiment, the online concierge system 102 applies the batch benefit model to the received order and to one or more time intervals, determining a predicted benefit to the online concierge system 102 for delaying identification of the received order to shoppers by each of the one or more time intervals. In response to none of the one or more time intervals having a predicted benefit to the online concierge system 102 equaling or exceeding the threshold predicted benefit, the online concierge system 102 does not delay identification of the received order to one or more shoppers. However, in response to a predicted benefit to the online concierge system 102 for delaying identification of the received order by a time interval equaling or exceeding a threshold predicted benefit, the online concierge system 102 selects 425 a time interval for delaying identification of the received order to one or more shoppers. To select 425 the time interval, the online concierge system 102 generates a predicted overall fulfillment time for the order for a time interval by combining the predicted amount of time for a shopper to fulfill the received order based on characteristics of the received order from application of the fulfillment model to the order and the time interval. The online concierge system 102 determines a probability of a sum of a time when the received order was received 415 and the overall fulfillment time exceeding a time identified by the received order, so the determined probability indicates a probability of the received order being fulfilled later than the time identified by the received order.

In various embodiments, the online concierge system 102 trains and maintains a late fulfillment model that receives an overall fulfillment time and an order and outputs a probability of the order being fulfilled later than a time identified by the order. To train the late fulfillment model, training data is generated comprising a plurality of examples. Each example of the late fulfillment training data includes an example late fulfillment order and a fulfillment time for the example late fulfillment order and may include additional information. A label is applied to each example, with a label applied to an example indicating whether the example late fulfillment order was fulfilled after a time identified in the example late fulfillment order. The online concierge system 102 may obtain examples for the late fulfillment training data by simulating fulfillment of orders with different characteristics and different fulfillment times to determine whether a fulfillment time caused the example late fulfillment order to be fulfilled after a time identified by the order or may obtain examples for the probability training data from fulfillment of prior orders received by the online concierge system 102 based on the fulfillment times for the prior orders.

The online concierge system 102 initializes one or more layers of a network comprising the late fulfillment model and applies the batch benefit fulfillment model to each of a plurality of examples of the late fulfillment training data. For an example of the late fulfillment training data, application of the late fulfillment model outputs a predicted probability of the example late fulfillment order included in the example being fulfilled after a time identified by the example late fulfillment order included in the example for the fulfillment time included in the example. The online concierge system 102 determines an error term from a loss function based on a difference between the label applied to the example of the late fulfillment training data and the probability of the example late fulfillment order included in the example being fulfilled after a time identified by the example late fulfillment order included in the example for the fulfillment time included in the example. The online concierge system 102 backpropagates the one or more error terms from the label applied to an example of the late fulfillment training data and the probability of the order included in the example being fulfilled after a time identified by the example late fulfillment order included in the example for the fulfillment time included in the example through layers of a network comprising the late fulfillment model. The backpropagation of the one or more error terms is repeated by the online concierge system 102 until the one or more loss functions satisfy one or more criteria. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for layers of the network comprising the late fulfillment model. For example, the online concierge system 102 stores the weights of connections between nodes in the network as the set of parameters of the network in a non-transitory computer readable storage medium.

In various embodiments, the online concierge system 102 generates an overall fulfillment time for the order for each of a plurality of time intervals, such as for each time interval having a predicted benefit to the online concierge system equaling or exceeding the threshold predicted benefit, and determines the probability of a sum of the time when the received order was received 415 and the overall fulfillment time exceeding the time identified by the received order for each of the plurality of time intervals. The online concierge system 102 selects 425 a time interval corresponding to a minimum probability of the sum of the time when the received order was received 415 and the overall fulfillment time exceeding the time identified by the received order, so the selected time interval minimizes a probability of the received order being fulfilled later than the time identified by the received order. Thus, the selected time interval minimizes the probability of the received order being fulfilled after the time identified by the order while providing a benefit to the online concierge system 102 by increasing a likelihood of the received order being included in a batch for fulfillment with one or more other orders.

In other embodiments, the online concierge system 102 combines application of the batch benefit model and the fulfillment model to the received order. For example, the batch benefit model outputs a predicted amount of time saved for delaying identification of the received order to shoppers, so the online concierge system 102 applies the batch benefit model to different time intervals, determining a predicted amount of time saved for each of the different time intervals. The online concierge system 102, for each time interval, determines the overall fulfillment time by summing the time interval for delaying identification of the order to shoppers and the predicted amount of time for a shopper to fulfill the received order based on characteristics of the received order from application of the fulfillment model to the order and decreases the sum by the predicted amount of time saved for the time interval. For each overall fulfillment time and corresponding time interval, the online concierge system 102 determines a probability of the received order being fulfilled after the time identified by the received order by applying the late fulfillment model to combinations of the received order and the overall fulfillment time. The online concierge system 102 identifies a set of time intervals corresponding to overall fulfillment times having less than a threshold probability of the received order being fulfilled after the time identified by the received order and selects 425 a time interval of the set. For example, the online concierge system 102 selects 425 a time interval of the set having a minimum probability of the received order being fulfilled after the time identified by the received order. Hence, the online concierge system 102 selects a time interval to delay identification of the received orders that minimizes a probability of the received order being fulfilled later than the time identified by the received order and that increases a likelihood of the received order being included in a batch with one or more other orders to allow the online concierge system 102 to more efficiently allocate resources for order fulfillment by allowing a single shopper to fulfill the received order along with one or more other orders included in a batch with the received order.

In response to selecting the time interval for delaying identification of the received order, the online concierge system 102 subsequently displays 430 the received order to one or more shoppers after the selected time interval lapses. Additionally, the online concierge system 102 evaluates one or more orders received after the received order and during the selected time interval for inclusion in or one or more batches that also include the received order. The online concierge system 102 may use any suitable method for selecting one or more orders received after the received order to include in a batch including the received order. For example, the online concierge system 102 selects one or more orders received after the received order that identify a common warehouse 110 as the received order, that specify a location within a threshold distance of the received order, that specify a time for fulfillment within a threshold amount of the time identified by the received order, or that satisfy any other suitable criteria. In various embodiments, the online concierge system 102 accounts for types of items included in various orders, numbers of items included in various orders, and any other characteristics of orders when determining whether to include different orders in a batch. The online concierge system 102 may display one or more batches that include the received order and one or more other users to shoppers during the selected time interval, while withholding display 430 of the received order as an individual order until the selected time interval has lapsed, allowing shoppers to select a batch including the received order during the selected time interval but not allowing shoppers to individually select the received order during the selected time interval. In various embodiments, after the selected time interval lapses, the online concierge system 102 displays 430 the received order to shoppers in conjunction with one or more batches including the received order and one or more additional orders received after the received order and during the selected time interval, allowing shoppers to select a batch including the received order and other orders. Hence, delaying display 430 of the received order by the selected time interval allows the online concierge system 102 to increase a number of opportunities for including the received order in one or more batches, enabling more efficient fulfillment of orders by shoppers.

Figure 5:
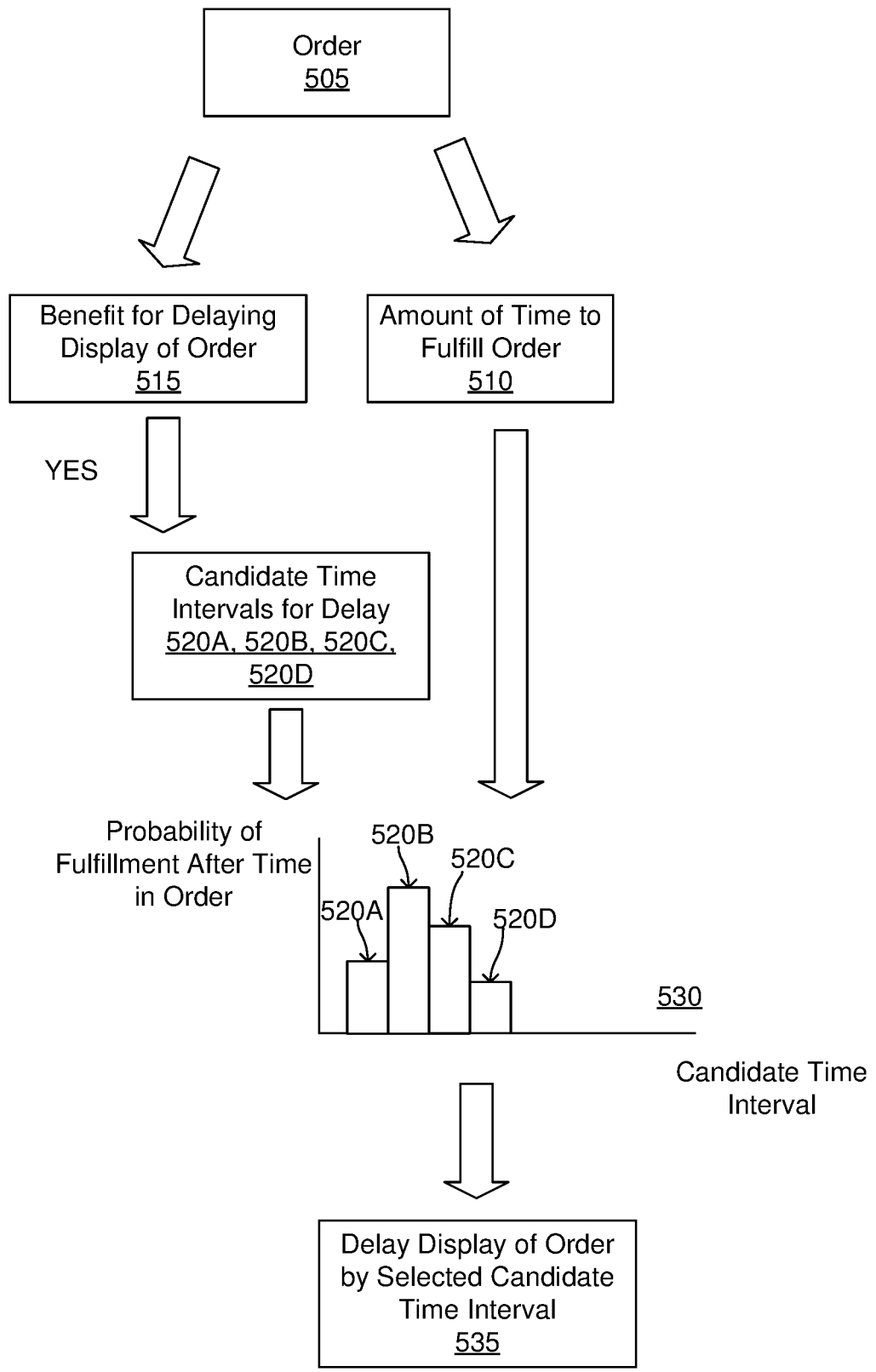
FIG. 5 is a process flow diagram of a method for determining a time interval for delaying assignment of one or more orders to a shopper, according to one embodiment.

FIG. 5 is a process flow diagram of a method for determining a time interval for delaying assignment of one or more orders to a shopper. In response to receiving an order 505 from a user identifying a time for fulfillment, such as a discrete time interval or a specific time, an online concierge system 102 determines an amount of time 510 for a shopper to fulfill the order 505 based on characteristics of the order 505. In various embodiments, the online concierge system 102 applies a trained fulfillment model, further described above in conjunction with FIG. 4, to characteristics of the order 505, and the trained fulfillment model outputs the amount of time 510 for a shopper to fulfill the order 505. The online concierge system 102 stores the amount of time for the shopper to fulfill the order in association with the order 505.

Additionally, in the embodiment shown in FIG. 5, the online concierge system 102 determines a benefit 515 to the online concierge system 102 from delaying display of the order 505 to shoppers for selection. In various embodiments, the online concierge system 102 applies a trained batch benefit model to one or more combinations of the order 505 and time intervals, as further described above in conjunction with FIG. 4. The batch benefit model outputs a predicted benefit to the online concierge system 102 for delaying display of the order 505 to shoppers by a time interval. For example, the batch benefit model outputs an amount of time saved for fulfilling the order 505 by delaying display of the order 505 to shoppers by a time interval provided as input to the batch benefit model along with characteristics of the order 505. As including multiple orders in a batch allows more efficient fulfillment of multiple orders by a shopper, the benefit 515 to the online concierge system 102 from delaying display of the order 505 to shoppers allows the online concierge system 102 to receive additional orders that may be evaluated for inclusion in a batch along with the order 505. Hence, the benefit 515 to the online concierge system 102 for delaying display of the order 505 to shoppers accounts for an increase in a number of orders to evaluate for including in a batch with the order 505 by allowing the online concierge system 102 to evaluate orders received later than the order 505 for inclusion in a batch with the order 505.

In various embodiments, the online concierge system 102 determines whether the benefit 515 to the online concierge system 102 from delaying display of the order 505 to shoppers by at least one time interval satisfies one or more criteria. For example, the online concierge system 102 determines whether the benefit 515 to the online concierge system 102 from delaying display of the order 505 to shoppers by at least one time interval equals or exceeds a threshold amount. In response to the to the benefit 515 online concierge system 102 from delaying display of the order 505 to shoppers not satisfying the one or more criteria for at least one time interval, the online concierge system 102 displays the order 505 to one or more shoppers without delay.

However, in response to the benefit 515 to the online concierge system 102 from delaying display of the order 505 to shoppers for one or more time intervals satisfying the one or more criteria, the online concierge system 102 identifies a set of candidate time intervals 520A, 520B, 520C, 520D (also referred to individually and collectively using reference number 520) for delaying display of the order 505 to shoppers. For example, the set of candidate time intervals 520 includes time intervals corresponding to a benefit 515 to the online concierge system 102 from delaying display of the order 505 to shoppers satisfying the one or more criteria (e.g., having at least a threshold benefit 515 to the online concierge system 102 from delaying display of the order 505 to shoppers). While FIG. 5 shows an example where the set of candidate time intervals 520 includes four time intervals, the set of candidate time intervals 520 may include any number of time intervals.

For the set of candidate time intervals 520, the online concierge system 102 generates a distribution 530 identifying a probability of the order 505 being fulfilled after a time identified by the order 505 for each candidate time interval 520. For a candidate time interval 520 of the set, the online concierge system 102 determines a predicted overall fulfillment time for the order 505 by combining the amount 510 of time for a shopper to fulfill the order 505 and the candidate time interval 520; in some embodiments, such as those where the benefit 515 to the online concierge system 102 for delaying display of the order 505 to shoppers is determined as an amount of time saved for fulfilling the order, the online concierge system 102 also reduces the combination of the amount 510 of time for the shopper to fulfill the order 505 and the candidate time interval 520 by the benefit 515 to the online concierge system 102 for delaying display of the order 505 to shoppers by the candidate time interval 520. The online concierge system 102 applies a late fulfillment model, further described above in conjunction with FIG. 4, to the predicted overall fulfillment time and to characteristics of the order 505 to determine a probability of the order 505 being fulfilled after the time identified by the order 505 when the order has the predicted overall fulfillment time. Hence, the distribution 530 identifies probabilities of the order 505 being fulfilled later than the time identified by the order 505 when the order 505 is delayed from display to shoppers by different candidate time intervals 520A, 520B, 520C, 520D.

From the distribution 530, the online concierge system 102 selects a candidate time interval 520. For example, the online concierge system 102 selects the candidate time interval 520 having a minimum probability of the order 505 being fulfilled later than the time identified by the order 505. Hence, in the example of FIG. 5, the online concierge system 102 selects candidate time interval 520D, which has the minimum probability of the order 505 being fulfilled later than the time identified by the order 505. The online concierge system 102 delays 535 display of the order 505 to shoppers for the selected candidate time interval 520.

As the online concierge system 102 receives additional orders during the selected candidate time interval 520, the online concierge system 102 evaluates the additional orders for inclusion in one or more batches that include the order 505 and one or more of the additional orders, as further described above in conjunction with FIG. 4. After the selected candidate time interval 520 lapses, the online concierge system 102 displays the order 505 to shoppers, allowing a shopper to select the order 505 for fulfillment. Additionally, the online concierge system 102 displays one or more batches that include at least one order received later than the order 505 to the shoppers. Thus, delaying display of the order 505 to shoppers allows the online concierge system 102 to evaluate a larger number of orders, including orders received after the order 505 was received and before the selected candidate time interval 520 lapses, for inclusion in one or more batches with the order 505. Increasing the number of orders evaluated for inclusion in a batch with the order 505 increases a likelihood of the online concierge system 102 generating a batch including the order 505 and one or more other orders, which allows for more efficient allocation of resources for order fulfillment.

System Architecture

Figure 6:
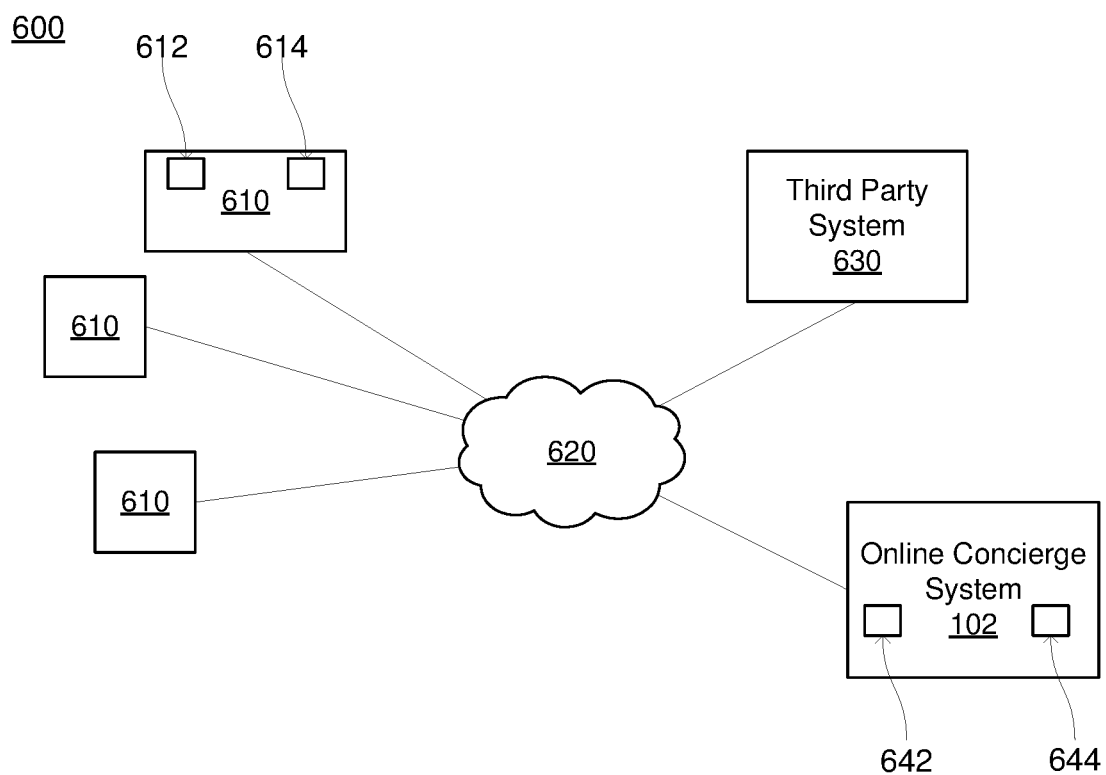
FIG. 6 is a block diagram of a system environment in which an online concierge system operates, according to one embodiment.

FIG. 6 is a block diagram of a system environment 600 for an online concierge system 102. The system environment 600 shown by FIG. 6 comprises one or more client devices 610, a network 620, one or more third-party systems 630, and the online concierge system 102. In alternative configurations, different and/or additional components may be included in the system environment 600.

The client devices 610 are one or more computing devices capable of receiving user input as well as transmitting and/or receiving data via the network 620. In one embodiment, a client device 610 is a conventional computer system, such as a desktop or a laptop computer. Alternatively, a client device 610 may be a device having computer functionality, such as a personal digital assistant (PDA), a mobile telephone, a smartphone, or another suitable device. A client device 610 is configured to communicate via the network 620. In one embodiment, a client device 610 executes an application allowing a user of the client device 610 to interact with the online concierge system 102. For example, the client device 610 executes a customer mobile application 106 or a shopper mobile application 112, as further described above in conjunction with FIGS. 3A and 3B, respectively, to enable interaction between the client device 610 and the online concierge system 102. As another example, a client device 610 executes a browser application to enable interaction between the client device 610 and the online concierge system 102 via the network 620. In another embodiment, a client device 610 interacts with the online concierge system 102 through an application programming interface (API) running on a native operating system of the client device 610, such as IOS® or ANDROID™.

A client device 610 includes one or more processors 612 configured to control operation of the client device 610 by performing functions. In various embodiments, a client device 610 includes a memory 614 comprising a non-transitory storage medium on which instructions are encoded. The memory 614 may have instructions encoded thereon that, when executed by the processor 612, cause the processor to perform functions to execute the customer mobile application 106 or the shopper mobile application 112 to provide the functions further described above in conjunction with FIGS. 3A and 3B, respectively.

The client devices 610 are configured to communicate via the network 620, which may comprise any combination of local area and/or wide area networks, using both wired and/or wireless communication systems. In one embodiment, the network 620 uses standard communications technologies and/or protocols. For example, the network 620 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 620 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 620 may be represented using any suitable format, such as hypertext markup language (HTML) or extensible markup language (XML). In some embodiments, all or some of the communication links of the network 620 may be encrypted using any suitable technique or techniques.

One or more third party systems 630 may be coupled to the network 620 for communicating with the online concierge system 102 or with the one or more client devices 610. In one embodiment, a third party system 630 is an application provider communicating information describing applications for execution by a client device 610 or communicating data to client devices 610 for use by an application executing on the client device. In other embodiments, a third party system 630 provides content or other information for presentation via a client device 610. For example, the third party system 630 stores one or more web pages and transmits the web pages to a client device 610 or to the online concierge system 102. The third party system 630 may also communicate information to the online concierge system 102, such as advertisements, content, or information about an application provided by the third party system 630.

The online concierge system 102 includes one or more processors 642 configured to control operation of the online concierge system 102 by performing functions. In various embodiments, the online concierge system 102 includes a memory 644 comprising a non-transitory storage medium on which instructions are encoded. The memory 644 may have instructions encoded thereon corresponding to the modules further described above in conjunction with FIG. 2 that, when executed by the processor 642, cause the processor to perform the functionality further described above in conjunction with FIG. 2 or FIGS. 4 and 5. For example, the memory 644 has instructions encoded thereon that, when executed by the processor 642, cause the processor 642 determine whether to delaying display of an order to a shopper, as well as determine a time interval by which display of the order to one or more shoppers is delayed in response to determining to delay display of the order, as further described above in conjunction with FIGS. 4 and 5. Additionally, the online concierge system 102 includes a communication interface configured to connect the online concierge system 102 to one or more networks, such as network 620, or to otherwise communicate with devices (e.g., client devices 610) connected to the one or more networks.

One or more of a client device, a third party system 630, or the online concierge system 102 may be special purpose computing devices configured to perform specific functions, as further described above in conjunction with FIGS. 2-5, and may include specific computing components such as processors, memories, communication interfaces, or the like.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    training, by one or more processors of an online concierge system, a machine learning model that outputs a predicted benefit from delaying identification of an order to shoppers for fulfillment, wherein training of the machine learning model comprises:
        applying, by the one or more processors, the machine learning model to examples of batching training data, each example of the batching training data including a time interval for delaying an example order, one or more information describing the example order, and a benefit label applied to each example of the batching training data identifying a benefit to the online concierge system from delaying identification of the example order;
        backpropagating, by the one or more processors, one or more error terms obtained from one or more loss functions associated with the machine learning model to update a set of parameters of the machine learning model, the backpropagating comprising updating, by the one or more processors, one or more of the error terms based on a difference between the benefit label applied to an example of the batching training data and a predicted benefit to the online concierge system from delaying identification of the example order; and
        stopping the backpropagation after the one or more loss functions satisfy one or more criteria;
    receiving the order at the online concierge system;
    determining, by the one or more processors, the predicted benefit to the online concierge system for delaying display of the order to one or more shoppers for each of a plurality of candidate time intervals;
    selecting, based on the predicted benefit associated with each of the plurality of candidate time intervals, a time interval of the plurality of time intervals for delaying display of the order to the one or more shoppers until after the selected time interval;
    evaluating one or more additional orders for inclusion of the one or more additional orders in a batch of orders that includes the order to be displayed until after the selected time interval; and
    displaying the batch of orders to the one or more shoppers after the selected time interval lapses.

2. The method of claim 1, wherein displaying the batch of orders to the one or more shoppers after the selected time interval lapses comprises:
    displaying the order and at least one batch including the order and an additional order received after the order.

3. The method of claim 1, wherein the predicted benefit from delaying identification of the order to shoppers for fulfillment for a candidate time interval comprises a probability of the order being included in at least one batch.

4. The method of claim 3, wherein the selected time interval is selected based at least on the probability of the order being included in at least one batch equaling or exceeding a threshold.

5. The method of claim 1, wherein the predicted benefit from delaying identification of the order to shoppers for fulfillment for a candidate time interval comprises an amount of time saved for fulfilling the order.

6. The method of claim 5, wherein the selected time interval is selected based at least on the amount of time saved for fulfilling the order equaling or exceeding a threshold.

7. The method of claim 1, wherein selecting the time interval of the plurality of candidate time intervals for delaying display of the order to the one or more shoppers comprises:
    determining a predicted amount of time to fulfill the order from characteristics of the order;
    for each of a set of candidate time intervals:
        determining an overall fulfillment time for the order as a combination of the predicted amount of time to fulfill the order and the candidate time interval;
        determining a probability of the order being fulfilled later than the time identified by the order when the order is delayed from display to shoppers by the candidate time interval from the overall fulfillment time; and
    selecting a time interval of the set based on the determine probabilities.

8. The method of claim 7, wherein selecting the time interval of the set based on the determine probabilities comprises:
    selecting a time interval having a minimum determined probability.

9. The method of claim 7, wherein determining the predicted amount of time to fulfill the order from characteristics of the order comprises:
    applying a fulfillment model to characteristics of the order, the fulfillment model trained by:
        obtaining training data including a plurality of examples, each example including information describing a fulfilled order and having a label applied specifying a length of time from the online concierge system receiving a previously fulfilled order and the online concierge system receiving an indication that the fulfilled order was fulfilled;

backpropagating one or more error terms obtained from one or more loss functions to update a set of parameters of the fulfillment model, the backpropagating performed through a network comprising the fulfillment model and one or more of the error terms based on a difference between a label applied to an example of the training data and a predicted amount of time to fulfill an order corresponding to the example of the training data; and stopping the backpropagation after the one or more loss functions satisfy one or more criteria.

10. A method comprising:

receiving an order at an online concierge system, the order identifying a time for fulfillment;

determining, by one or more processors of the online concierge system, a predicted amount of time to fulfill the order based on characteristics of the order;

determining, by one or more processors of the online concierge system, a predicted benefit to the online concierge system for delaying display of the order to one or more shoppers for each of a plurality of candidate time intervals, wherein determining the predicted benefit for a candidate time interval comprises:

determining, by one or more processors of the online concierge system, an overall fulfillment time for the order as a combination of the predicted amount of time to fulfill the order and the candidate time interval;

determining, by one or more processors of the online concierge system, a probability of the order being fulfilled later than the time identified by the order when the order is delayed from display to shoppers by the candidate time interval time by applying a late fulfillment machine learning model to determine the probability of the order being fulfilled later than the time identified by the order, wherein training of the late fulfillment machine learning model comprises:

obtaining, by one or more processors of the online concierge system, training data including a plurality of examples, each example including an example late fulfillment order, a fulfillment time for the example late fulfillment order, and a label applied to each example indicating whether the example late fulfillment order was fulfilled later than a time identified in the example late fulfillment order;

backpropagating, by one or more processors of the online concierge system, one or more error terms obtained from one or more loss functions associated with the late fulfillment machine learning model to update a set of parameters of the late fulfillment machine learning model, the backpropagating comprising updating, by the one or more processors, one or more of the error terms based on a difference between the label applied to an example of the training data and a predicted probability of the example late fulfillment order being fulfilled later than the time identified by the example late fulfillment order; and stopping the backpropagation after the one or more loss functions satisfy one or more criteria;

selecting a time interval from the plurality of candidate time intervals for delaying display of the order to the one or more shoppers based on the determined probabilities;

evaluating one or more additional orders for inclusion of the one or more additional orders in a batch of orders that includes the order; and displaying the batch of orders to the one or more shoppers after the selected time interval lapses.

11. The method of claim 10, wherein displaying the batch of orders to the one or more shoppers after the selected time interval lapses comprises:

displaying the order and at least one batch including the order and an additional order received after the order.

12. The method of claim 10, wherein the predicted benefit from delaying identification of the order to shoppers for fulfillment for a candidate time interval comprises a probability of the order being included in at least one batch.

13. The method of claim 12, wherein the selected time interval is selected based at least on the probability of the order being included in at least one batch equaling or exceeding a threshold.

14. The method of claim 10, wherein the predicted benefit from delaying identification of the order to shoppers for fulfillment a candidate the time interval comprises an amount of time saved for fulfilling the order.

15. The method of claim 14, wherein the selected time interval is selected based at least on the amount of time saved for fulfilling the order equaling or exceeding a threshold.

16. The method of claim 10, wherein determining the predicted amount of time to fulfill the order based on characteristics of the order comprises:

applying a fulfillment model to characteristics of the order, the fulfillment model trained by:

obtaining training data including a plurality of examples, each example including information describing a fulfilled order and having a label applied specifying a length of time from the online concierge system receiving a previously fulfilled order and the online concierge system receiving an indication that the fulfilled order was fulfilled;

backpropagating one or more error terms obtained from one or more loss functions to update a set of parameters of the fulfillment model, the backpropagating performed through a network comprising the fulfillment model and one or more of the error terms based on a difference between a label applied to an example of the training data and a predicted amount of time to fulfill an order corresponding to the example of the training data; and stopping the backpropagation after the one or more loss functions satisfy one or more criteria.

17. The method of claim 10, wherein determining the predicted benefit to the online concierge system for delaying display of the order to one or more shoppers for each of the plurality of candidate time intervals comprises:

applying a batch benefit model to each combination of the order and a time interval of the plurality of time intervals, the batch benefit model outputting a predicted benefit from delaying identification of the order to shoppers for fulfillment for the candidate time interval, wherein training of the batch benefit model comprises:

applying, by the one or more processors, the batch benefit model to examples of batching training data, each example of the batching training data including a time interval for delaying an example order, one or more information describing the example order, and a benefit label applied to each example of the batching training data identifying a benefit to the online concierge system from delaying identification of the example order corresponding to the example by the time interval;

backpropagating, by the one or more processors, one or more error terms obtained from one or more loss functions associated with the machine learning model to update a set of parameters of the batch benefit model, the backpropagating comprising updating, by the one or more processors, one or more of the error terms based on a difference between the benefit label applied to an example of the batching training data and a predicted benefit to the online concierge system from delaying identification of the example order; and stopping the backpropagation after the one or more loss functions satisfy one or more criteria.

18. A computer program product comprising a non-transitory computer readable storage medium having instructions encoded thereon that, when executed by a processor, cause the processor to:

receive an order at an online concierge system, the order identifying a time for fulfillment;

determine, by one or more processors of the online concierge system, a predicted amount of time to fulfill the order based on characteristics of the order;

determine, by one or more processors of the online concierge system, a predicted benefit to the online concierge system for delaying display of the order to one or more shoppers for each of a plurality of candidate time intervals, wherein determining the predicted benefit for a candidate time interval comprises:

determine, by one or more processors of the online concierge system, an overall fulfillment time for the order as a combination of the predicted amount of time to fulfill the order and the candidate time interval;

determine, by one or more processors of the online concierge system, a probability of the order being fulfilled later than the time identified by the order when the order is delayed from display to shoppers by the candidate time interval by applying a late fulfillment machine learning model to determine the probability of the order being fulfilled later than the time identified by the order, wherein training of the late fulfillment machine learning model comprises:

obtaining, by one or more processors of the online concierge system, training data including a plurality of examples, each example including an example late fulfillment order, a fulfillment time for the example late fulfillment order, and a label applied to each example indicating whether the example late fulfillment order was fulfilled later than a time identified in the example late fulfillment order;

backpropagating, by one or more processors of the online concierge system, one or more error terms obtained from one or more loss functions associated with the late fulfillment machine learning model to update a set of parameters of the late fulfillment machine learning model, the backpropagating comprising updating, by the one or more processors, one or more of the error terms based on a difference between the label applied to an example of the training data and a predicted probability of the example late fulfillment order being fulfilled later than the time identified by the example late fulfillment order; and stopping the backpropagation after the one or more loss functions satisfy one or more criteria;

select a time interval from the plurality of candidate time intervals for delaying display of the order to the one or more shoppers based on the determined probabilities;

evaluate one or more additional orders for inclusion of the one or more additional orders in a batch of orders that includes the order; and display the batch of orders to the one or more shoppers after the selected time interval lapses.

19. The computer program product of claim 18, wherein instructions to display the order to the one or more shoppers after the selected time interval lapses comprises instructions to:

display the order and at least one batch including the order and an additional order received after the order and during the selected time interval.

20. The computer program product of claim 18, wherein instructions to determine the predicted amount of time to fulfill the order based on characteristics of the order comprises instructions to:

apply a fulfillment model to characteristics of the order, the fulfillment model trained by:

obtaining training data including a plurality of examples, each example including information describing a fulfilled order and having a label applied specifying a length of time from the online concierge system receiving a previously fulfilled order and the online concierge system receiving an indication that the fulfilled order was fulfilled;

backpropagating one or more error terms obtained from one or more loss functions to update a set of parameters of the fulfillment model, the backpropagating performed through a network comprising the fulfillment model and one or more of the error terms based on a difference between a label applied to an example of the training data and a predicted amount of time to fulfill an order corresponding to the example of the training data; and stopping the backpropagation after the one or more loss functions satisfy one or more criteria.

21. The computer program product of claim 18, wherein instructions to determine the predicted benefit to the online concierge system for delaying display of the order to one or more shoppers for each of the plurality of candidate time intervals comprises instructions to:

apply a batch benefit model to each combination of the order and a time interval of the plurality of time intervals, the batch benefit model outputting a predicted benefit from delaying identification of the order to shoppers for fulfillment for the candidate time interval, wherein training of the batch benefit model comprises:

applying, by the one or more processors, the batch benefit model to examples of batching training data, each example of the batching training data including a time interval for delaying an example order, one or more information describing the example order, and a benefit label applied to each example of the batching training data identifying a benefit to the online concierge system from delaying identification of the example order corresponding to the example by the time interval;

backpropagating, by the one or more processors, one or more error terms obtained from one or more loss functions associated with the machine learning model to update a set of parameters of the batch benefit model, the backpropagating comprising updating, by the one or more processors, one or more of the error terms based on a difference between the benefit label applied to an example of the batching training data and a predicted benefit to the online concierge system from delaying identification of the example order; and stopping the backpropagation after the one or more loss functions satisfy one or more criteria.

* * * * *